May 5, 1959  J. L. PETTUS  2,885,490
DIRECT POSITIVE SOUND RECORDING SYSTEM
Filed Dec. 22, 1954  2 Sheets-Sheet 1
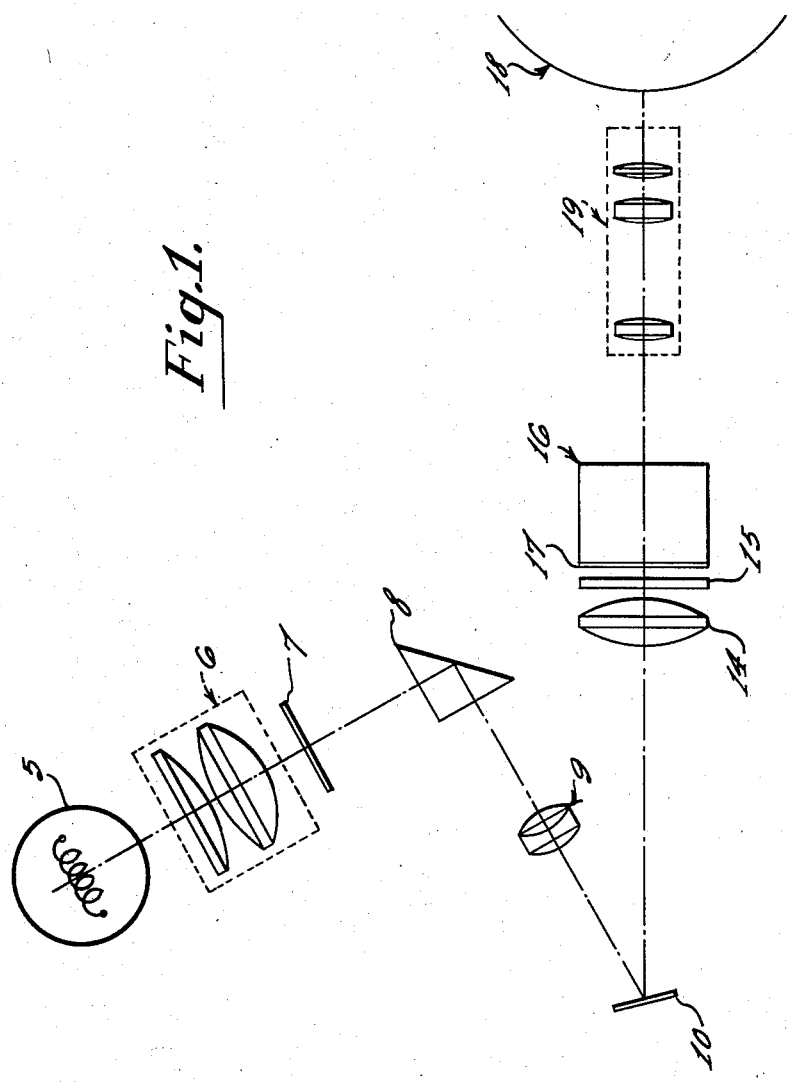
INVENTOR.
James L. Pettus
BY
ATTORNEY.

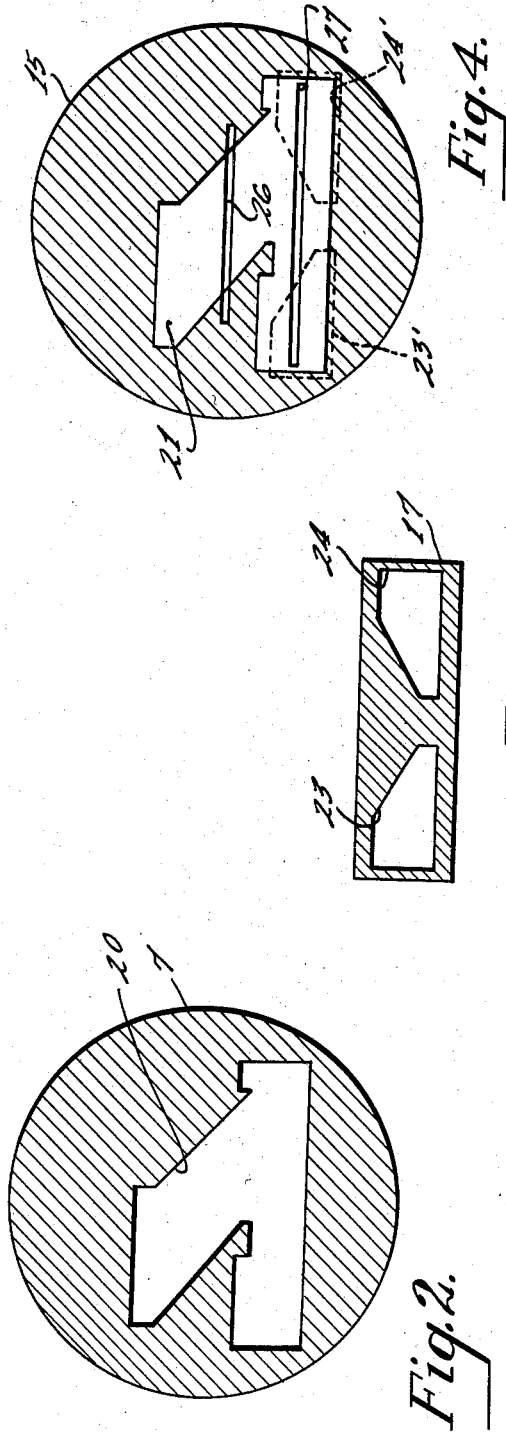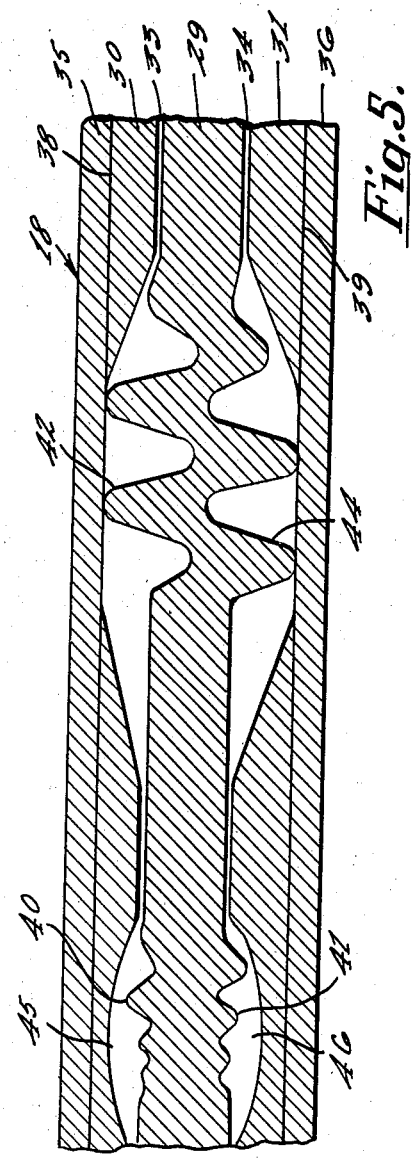

United States Patent Office

2,885,490
Patented May 5, 1959

2,885,490

DIRECT POSITIVE SOUND RECORDING SYSTEM

James L. Pettus, Encino, Calif., assignor to Radio Corporation of America, a corporation of Delaware Application December 22, 1954, Serial No. 476,875

3 Claims. (Cl. 179—100.3)

This invention relates to optical photographic sound recording systems, and particularly to such a system for recording a wide variable area bilateral Class "A" push-pull direct positive record.

In co-pending application, Ser. No. 477,073, filed December 22, 1954, now abandoned, and co-pending application, Serial No. 477,074, filed December 22, 1954, now Patent No. 2,784,260 of March 5, 1957, assigned to the same assignee, systems for producing optical records of the variable area Class "A" direct positive type are disclosed. The present invention produces this type of record which may have a 200 mil width to provide the advantage of a large signal-to-noise ratio in original recordings. The recording system is simple and economical to build, and has many advantages from the manufacturing standpoint. It utilizes a standard type of optical system now in general use, but provides a specific type of aperture to obtain the direct positive, Class "A," push-pull form of record with noise reduction. The system utilizes a slit plate having two slits and a single shutter, the separation between the slits providing a certain degree of anticipatory noise reduction.

The principal object of the invention, therefore, is to facilitate the recording of a wide, bilateral Class "A," push-pull, direct positive type of record.

Another object of the invention is to provide an improved wide, Class "A," push-pull, direct positive recording system.

A further object of the invention is to provide a simple and economic optical sound recording system for producing wide, bilateral, variable area, Class "A," push-pull, direct positive records.

The novel features which are believed to be characteristic of this invention, both as to the manner of its organization and the mode of its operation, will be better understood from the following description when read in conjunction with the accompanying drawings, in which:

Fig. 1 is a diagrammatic view of an optical sound recording system embodying the invention;

Fig. 2 is a detail view of the aperture plate embodied in the invention;

Fig. 3 is a detail view of the noise reduction shutter embodied in the invention;

Fig. 4 is a view of a combination of the light image and slit plate embodied in the invention; and Fig. 5 is a partial view of the sound record produced by the system shown in Fig. 1.

Referring now to the drawings, light from the exposure lamp 5 is projected by a condenser lens unit 6 to an aperture plate 7, the light therethrough being directed by a prism 8 and projection lens unit 9 to the mirror 10 of a galvanometer, not shown. The light from the mirror 10 is projected by the lens 14 to a slit plate 15, behind which, and closely adjacent thereto, is a shutter unit 16, driving a shutter 17, such as shown in Fig. 3. Light passing through the slits in plate 15 and the openings in the shutter of unit 16 is projected by a projection unit 19 to a film 18.

Referring now to Figs. 2, 3, and 4, Fig. 2 shows the aperture plate 7 with a light-passing trapezoidal shaped aperture 20. Thus, the light beam projected to the slit plate 15 will be of the shape of aperture 20, as shown by the image 21 in Fig. 4. As mentioned above, the shutter 17, driven by the unit 16, has two light passing trapezoidal shaped apertures 23 and 24, the shutter being placed directly behind the slit plate 15. The shutter openings 23 and 24 are shown in dotted lines 23' and 24' in the combination drawing shown in Fig. 4.

The slit plate 15 has two slits therein, one being a modulating slit 26 and the other a noise reduction slit 27, which is of a greater length than the modulating slit 26. The image 21 is vibrated perpendicularly to the slits 26 and 27, in accordance with the instantaneous values of a signal being recorded, and the movement of the shutter 17 is also perpendicular to these slits, in accordance with the average value of the signal being recorded. Thus, for zero signal and 100% noise reduction, light will pass through the center of the slit 26 to form the portion 29 of the record shown in Fig. 5, and light will pass through the openings 23 and 24 to form the portions 30 and 31 of the record. The two narrow bias lines 33 and 34 are produced by the elimination of light, due to the slight separation of the ends of the light passing apertures 20, 23, and 24, at the slits.

The portions 35 and 36 of the record shown in Fig. 5 are produced by the end portions of the slit 27 which extend beyond the ends of slit 26. These areas 35 and 36 will always be exposed to light since the shutter 17 never completely closes off the ends of the slit 27, in view of the shape of the openings 23 and 24 and the predetermined excursion of the vane 17. The slight overlapping of the ends of the slit 26 with the ends of the slit 27 will produce a slightly increased density between the areas 30—35 and 31—36, which may create heavier lines, as shown at 38 and 39.

To explain the operation of the system above described, the mirror 10 is vibrated in accordance with the instantaneous values of the signal to be recorded, which results in the vibration of the image 21 perpendicular to the slits 26 and 27. Therefore, the sloping edges of the upper portion of the image 21, which are at an angle of substantially 30 degrees to slit 26, will produce the modulations shown at 40 and 41 in the left hand portion of Fig. 5 and the modulations 42 and 44 shown in the central portion of Fig. 5. As the amplitude of the signal increases and decreases, the shutter 17 is moved up and down in accordance with the average value of the signal, since the noise reduction unit includes a rectifier. Thus, to permit only the upper part of the image 21 to "paint in" the modulations 40—44, the rectifier noise reduction currents move the shutter downwardly to eliminate light through the slit 27. Thus, at 100% modulation, the film area between the lines 38 and 39 will only receive light from the modulating slit 26. At any modulation less than 100%, the shutter 17 will permit light to pass to the areas 30 and 31, as shown at 45 and 46.

There is, therefore, provided a variable area sound recording system which may utilize standard recording elements and produce a bilateral, Class "A," push-pull, direct positive record of any desired width, such as 200 mils, and having a high signal-to-noise ratio. As mentioned above, since the light passing the noise reduction slit 27 is separated from the modulating slit 26 as it reaches the film 18, a certain degree of anticipatory noise reduction is provided to reduce any clipping of abruptly impressed high level signals.

I claim:

1. A variable area, photographic, direct positive sound record recording system comprising a light source, means for forming light from said source into a particularly shaped beam having an upper modulating portion and a lower noise reduction portion, a slit plate having a modulating slit and a noise reduction slit therein, means for vibrating said light beam on said plate perpendicular to said slits in accordance with the instantaneous values of a signal to be recorded, means for varying the amount of light through said noise reduction slit in accordance with the average value of said signal to be recorded, and means for projecting light from said slits, said means for varying the light through said noise reduction slit including a substantially rectangular shutter vane having a pair of trapezoidal openings with the adjacent sides of each opening at an angle of substantially 30 degrees to said noise reduction slit.

2. A variable area photographic direct positive sound recording system in accordance with claim 1, in which the transverse dimension of the upper portion of said beam at said modulating slit is less than the portion of the beam passing between the adjacent sides of said openings and through said noise reduction slit at zero modulation to eliminate light along two narrow strips.

3. A variable area, photographic, direct positive sound record recording system comprising a source of light, and means for projecting and controlling the projection of light from said source, said means including a mask having an aperture therein and a plate having parallel, separated slits therein perpendicular to the movement of said film, said aperture forming a beam on said plate having sides crossing one of said slits at an angle thereto, said beam having a substantially rectangular portion covering the other of said slits, and said means including a substantially rectangular shutter having a trapezoidal opening at each end thereof having one side of each opening crossing said other slit at an angle thereto.

References Cited in the file of this patent

UNITED STATES PATENTS

| | | |
|---|---|---|
| 2,289,893 | Wolfe | July 14, 1942 |

FOREIGN PATENTS

| | | |
|---|---|---|
| 470,137 | Great Britain | Aug. 10, 1937 |
| 866,833 | France | Sept. 8, 1941 |